United States Patent [19]
Becker

[11] 4,070,043
[45] Jan. 24, 1978

[54] DOUBLE-WALLED PIPE CONSTRUCTION

[75] Inventor: Floyd W. Becker, Calgary, Canada

[73] Assignee: Drill Systems Inc., Calgary, Canada

[21] Appl. No.: 761,185

[22] Filed: Jan. 21, 1977

[30] Foreign Application Priority Data

Apr. 12, 1976 Canada .................................. 250031

[51] Int. Cl.² .......................................... F16L 47/00
[52] U.S. Cl. ................................ 285/133 A; 285/138; 285/286
[58] Field of Search ............... 285/133 A, 133 R, 136, 285/138, 286, 47, 25, 28; 403/164, 202, 266, 267; 138/114

[56] References Cited
U.S. PATENT DOCUMENTS

| | | | |
|---|---|---|---|
| 921,061 | 5/1909 | Barnes | 285/138 X |
| 1,647,386 | 11/1927 | Weis | 403/202 X |
| 1,909,075 | 5/1933 | Ricker et al. | 285/133 A |
| 2,850,264 | 9/1958 | Grable | 285/133 A |
| 2,959,193 | 11/1960 | Guldenzoph et al. | 285/133 R X |
| 4,012,061 | 3/1977 | Olson | 285/133 A |

*Primary Examiner*—Wayne L. Shedd
*Attorney, Agent, or Firm*—H. Wayne Rock

[57] ABSTRACT

The present invention provides a means for mounting the inner pipe within the outer pipe of a double-walled pipe used in reverse-circulation drilling so that torques imparted to the outer pipe will not be imparted to the inner pipe, in order to avoid failure of the inner pipe. The inner pipe has a bushing slidably received thereon at each end, the bushing being affixed, as by a plurality of welded circumferentially spaced ribs, to the inner wall of the outer pipe so that the inner pipe is free to rotate relative to the outer pipe. An annular locating sleeve is received on and welded to the inner pipe adjacent each end of each bushing so that axial, or longitudinal movement of the inner pipe relative to the outer pipe is restrained. Since the inner pipe is free to rotate it will not be affected by excessive torque applied to the outer pipe and, in fact, the double-walled pipe can be given a higher torque rating than it would merit if the inner pipe were non-rotatably fixed to the outer pipe.

6 Claims, 2 Drawing Figures

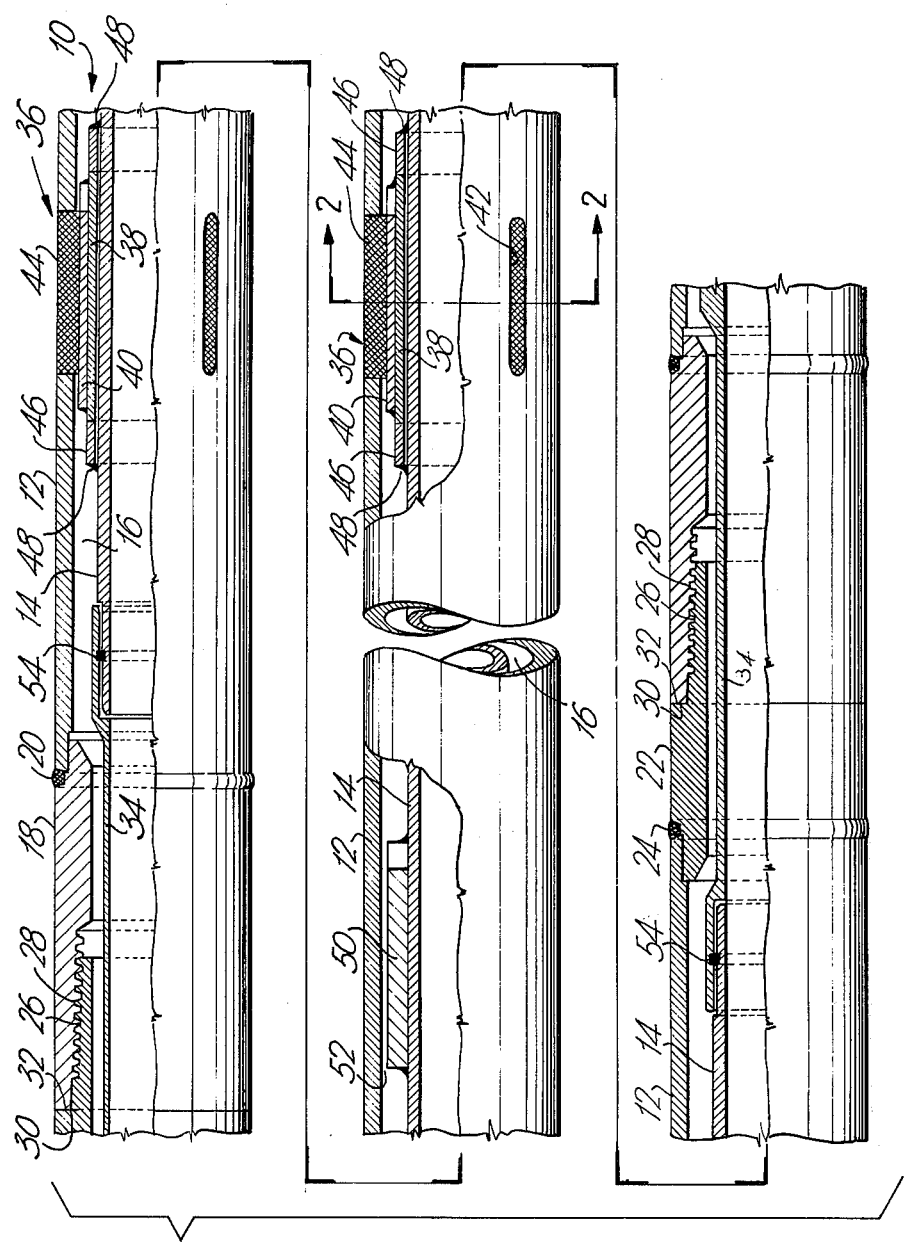
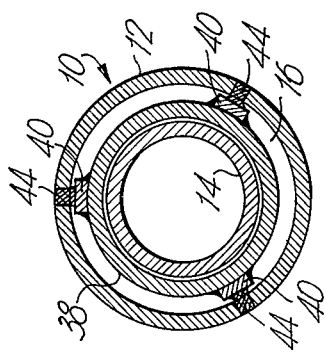

DOUBLE-WALLED PIPE CONSTRUCTION

The present invention relates in general to drill pipe and in particular to a means for mounting the inner pipe within the outer pipe of a double-walled pipe.

BACKGROUND OF THE INVENTION

Double-walled drill pipe as used in reverse-circulation drilling has been known for many years, as evidenced by U.S. Pat. No. 1,909,075 (Ricker et al, May 16, 1933) and Canadian Patent Nos. 630,100 (Grable, Oct. 31, 1961); 753,528 (Henderson, Feb. 28, 1967); 841,463 (Ellenburg, May 12, 1970); and 854,056 (Sandquist et al, Oct. 20, 1970). Each of these patents describes a drilling system using a double-walled pipe which uses an outer pipe and a concentric inner pipe which creates an annular flow passage between the pipes. A light fluid or gas such as air may be forced down from the surface through the annular flow passage to the cutting bit. This fluid then cools the bit and collects fragments and chips which result from the bit cutting into the ground. These cuttings are then carried by the fluid through a central passage in the inner pipe to the surface. The function of the outer pipe is to transmit torque and a vertical force down the drill hole to the bit, and to form the outer barrier of the annular passage. The function of the inner pipe is to form the inner wall of the annular passage and to form the outer boundary of the central passage. There is usually a connection between inner pipe sections of a made-up drill string to provide continuity of the annular and central passages. Such a connection is shown in Canadian Pat. No. 854,056.

In each of the above-identified patents the inner pipe is concentrically located in the outer pipe at a plurality of areas along its length and is fixed, as by welded ribs to the outer pipe to provide fixed connections at one or both ends which precludes relative rotation at the connection between the inner and outer pipes.

In rotary drilling operations, double wall pipes are subject to relatively high torque conditions resulting in variable circumferential angular deflection (twist) of the pipe and variable relatively high torsional stresses transmitted between the outer pipe and the inner pipe through the welded rib connections therebetween. Consequently, there have been failures in the double wall pipe at or adjacent to the area of the welded connections resulting from torque induced metal fatigue and/or excessively high torque conditions. If the inner pipe is of smaller guage with a thinner wll thickness or of a material of lesser strength that the outer pipe, the failure is most likely to occur in the wall of the inner pipe adjacent to the welded connection between theinner pipe and the ribs.

SUMMARY OF THE INVENTION

Failure of the inner pipe of a double-walled pipe string can be prevented if the inner pipe is isolated from the torque applied to and the angular deflections of the outer pipe. Such isolation can be achieved by mounting the inner pipe in annular bushings secured to the outer pipe at each end thereof so that the inner pipe is free to rotate relative to the bushings and the outer pipe. Longitudinal control is achieved by locating each bushing between a pair of locating sleeves affixed to the inner pipe. No torque is transmitted to the inner pipe, thereby overcoming the prior art problems and allowing the double-walled pipe to carry a greater torque rating.

In its basic form the present invention provides in a length of double-walled pipe for a reverse-circulation drill string including an outer pipe and an inner pipe concentrically disposed to provide a flow passage of annular cross-section between the pipes, the improvement for mounting the inner pipe within the outer pipe comprising, adjacent each end of the inner pipe: an annular bushing slidably received on the inner pipe; a plurality of circumferentially spaced locating straps positioned between the bushing and the inner wall of the outer pipe, the locating straps being fixed to the bushing and to the inner wall; and a pair of annular locating sleeves fixed to the outer surface of the inner pipe, each of the sleeves being positioned adjacent a corresponding end of the bushing; whereby the inner pipe is restrained from axial movement relative to the outer pipe by interaction between the sleeves and the bushing, while being free to rotate in the bushing.

BRIEF DESCRIPTION OF THE DRAWINGS

FIG. 1 shows a length of double-walled pipe according to the present invention, partly in section, and broken to show the overall length and end details.

FIG. 2 is a cross-section taken along the line 2 — 2 of FIG. 1.

DESCRIPTION OF THE PREFERRED EMBODIMENT

FIG. 1 shows a length of double-walled pipe 10 incorporating the present invention, the Figure showing one end in the upper section, an intermediate area and a portion adjacent the other end in the middle section, and the other end in the bottom section. As is well known in the art, the double-walled pipe includes an outer pipe 12 and an inner pipe 14 concentrically disposed to create a flow passage 16 of annular cross-section between the pipes.

FIG. 1 shows that there is a thickened box end 18 welded to one end of the outer pipe as at 20 and that there is a thickened pin end 22 welded to the other end as at 24. When the length of double-walled pipe 10 is connected in a drill string, the threads 26 of the box end mate with the threads 28 of the pin end of the next pipe and the shoulder 30 of the box end abuts the shoulder 32 of the pin end as in conventional joints. It is also seen that the ends of the inner pipe are spaced axially inwardly of the box and pin ends respectively. This permits the interconnection of the inner pipes, in a made up section of drill string, by a connector tube 34, such as that described and claimed in Canadian Pat. No. 854,056 assigned to the assignee of the present invention.

The means for mounting the inner pipe 14 within the outer pipe 12 will now be described. As seen in FIG. 1, there is located adjacent each end of the inner pipe a mounting means 36. For the sake of simplicity only one means will be described, it being understood that a similar mounting means is utilized at the other end of the inner pipe.

An annular bushing 38 is slidably received on the inner pipe 14 and the inner diameter thereof is slightly greater than the outer diameter of the inner pipe so that there can be free relative rotation of the bushing and the inner pipe. A plurality of ribs or locating straps 40, preferably at least three, are positioned between the bushing and the inner wall of the outer pipe, and are fixed, as by welding, to both the bushing and the outer pipe. The locating straps are circumferentially spaced as seen in FIG. 2 and they locate the bushing concentrically within the outer pipe. When welding the locating straps to the outer pipe it is usual to provide circumferentially spaced slots 42 in the outer pipe, the slots corresponding to the straps 40 so that weld 44 can fill each slot 42 and thus fix the locating straps to the outer pipe.

A pair of annular locating sleeves 46 are fixed, as by welding, to the outer surface of the inner pipe 14. One of the sleeves is positioned adjacent one end of the bushing; the other sleeve is positioned adjacent the other end of the bushing. Thus since the bushing is fixed to the outer pipe and the sleeves are fixed to the inner pipe it is seen that relative axial movement between the inner pipe and the outer pipe is restrained by interaction between the sleeves and the bushing. At the same time the inner pipe is concentrically mounted within the outer pipe and is free to rotate therein. With this mounting technique, the inner pipe 14 is isolated from the effects of torsional deflection in the outer pipe and it is still positively located longitudinally and concentrically within the outer pipe.

When assembling a length of double-walled pipe according to the present invention it is usual to first of all weld the locating straps 40 to the bushing 38. As indicated above it is desirable to utilize three locating straps equally spaced about the circumference of the bushing. Three straps will positively locate the bushing in the outer pipe but will not appreciably reduce the flow rate through the annular passage 16. The next step involves the positioning of the inner sleeve, the bushing and the outer sleeve on the inner pipe 14. When properly located longitudinally of the inner pipe the two sleeves 46 are welded to the inner pipe as at 48, it being noted that there is no weld at the junctures between the bushing and the sleeves. A very small clearance gap may be provided between the bushing and one of the sleeves so that there will be no interference to free relative rotation of the bushing and the inner pipe.

When both bushing assemblies and their associated sleeves are in place the inner pipe is slid onto the outer pipe and the locating straps 40 are aligned with the corresponding slots 42 in the outer pipe. The straps 40 are then welded to the outer pipe through the slots with weld 44. Upon completion of this welding step the inner pipe will be concentrically and longitudinally located within the outer pipe and will be free to rotate in the bushings 38, relative to the outer pipe.

If the overall length of the pipe 10 is very great there may be a whipping or deflection of the inner pipe between the mounts 36. This can be avoided by providing a plurality of circumferentially spaced additional locating straps 50 at one or more points intermediate the ends of the inner pipe. These additional locating straps are locating between the inner and outer pipes and are welded to the inner pipe. The height of each additional locating strap is such that when the inner pipe is concentric to the outer pipe there will be a clearance 52 between the outer pipe and the additional locating straps. These additional locating straps will reduce any whipping or transverse deflection of the inner pipe during use without inhibiting the relative rotation between the inner and outer pipes.

It might also be pointed out that since the connecting tube 34 is provided with O-ring seals 54 which engage with the inner pipe there will be a degree of transference of rotation of the inner pipe of one length of double-walled pipe to the inner pipe of the adjacent length of double-wall pipe in a made-up drill string.

It is understood that a person skilled in the art may find alternative configurations or orientations of the present invention which may achieve the desired results and which may not have been described herein. The scope of the present invention is thus to be ascertained by the claims appended hereto.

I claim

1. In a length of double-walled pipe for a reverse-circulation drill string including an outer pipe and an inner pipe concentrically disposed to provide a flow passage of annular cross-section between said pipes, the improvement for mounting said inner pipe within said outer pipe comprising, adjacent each end of said inner pipe: an annular bushing slidably received on said inner pipe; a plurality of circumferentially spaced locating straps positioned between said bushing and the inner wall of said outer pipe, said locating straps being fixed to said bushing and to said inner wall; and a pair of annular locating sleeves fixed to the outer surface of said inner pipe, each of said sleeves being positioned adjacent a corresponding end of said bushing; whereby said inner pipe is restrained from axial movement relative to said outer pipe by interaction between said sleeves and said bushing, while being free to rotate in said bushing.

2. The invention according to claim 1 and including a plurality of circumferentially spaced slots in said outer pipe, corresponding to said locating straps, through which said locating straps can be welded to said outer pipe.

3. The invention according to claim 2 including a plurality of additional locating straps circumferentially spaced and fixed to the outer surface of said inner pipe intermediate the ends of the inner pipe, there being a clearance between the inner wall of the outer pipe and said additional locating straps.

4. The invention according to claim 1 wherein said outer pipe has a thickened box end at one end thereof and a thickened pin end at the other end thereof, the ends of said inner pipe being spaced axially inwardly of said box and pin ends respectively.

5. A length of double-walled pipe for a reverse-circulation drill string including: an outer pipe having a thickened box end at one end thereof and a thickened pin end at the other end; an inner pipe concentrically mounted in said outer pipe to provide a flow passage of annular cross-section between said pipes, the ends of said inner pipe being spaced axially inwardly of said box end and said pin end respectively; and means for mounting said inner pipe within said outer pipe, said means comprising, for each end of said inner pipe: a bushing slidably received on said inner pipe and spaced axially inwardly of the end thereof; at least three circumferentially spaced locating straps positioned between and welded to said bushing and the inner wall of said outer pipe; and a pair of annular locating sleeves slidably received on said inner pipe, one of said sleeves being positioned adjacent one end of said bushing and being welded to said inner pipe, the other of said sleeves being positioned adjacent the other end of said bushing and being welded to said inner pipe; whereby said inner pipe is concentrically mounted in said outer pipe while being free to rotate in said bushing and being restrained from axial movement relative to said outer pipe by interaction between said sleeves and the associated bushing.

6. A length of double-walled pipe according to claim 5 and including at least three circumferentially spaced additional locating straps located in said flow passage and welded to said inner pipe intermediate the ends thereof, there being a clearance between the inner wall of said outer pipe and said additional locating straps.

* * * * *